US012467669B2

(12) United States Patent
Ladd (10) Patent No.: US 12,467,669 B2
(45) Date of Patent: *Nov. 11, 2025

(54) SYSTEMS AND METHODS FOR REGENERATIVE EJECTOR-BASED COOLING CYCLES (71) Applicant: Bechtel Energy Technologies & Solutions, Inc., Houston, TX (US)

(72) Inventor: David Ladd, Sugar Land, TX (US)

(73) Assignee: Bechtel Energy Technologies & Solutions, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/783,701

(22) Filed: Jul. 25, 2024

(65) Prior Publication Data
US 2024/0377114 A1 Nov. 14, 2024

Related U.S. Application Data (63) Continuation of application No. 18/340,642, filed on Jun. 23, 2023, which is a continuation of application No. 18/023,631, filed as application No. PCT/US2022/019352 on Mar. 8, 2022, now Pat. No. 11,725,858.

(51) Int. Cl.
F25B 43/00 (2006.01)
F25B 40/02 (2006.01)
F25B 7/00 (2006.01)

(52) U.S. Cl.
CPC ............ F25B 43/006 (2013.01); F25B 40/02 (2013.01); F25B 7/00 (2013.01); F25B 2341/0011 (2013.01); F25B 2400/13 (2013.01); F25B 2400/23 (2013.01); F25B 2600/13 (2013.01)

(58) Field of Classification Search
CPC .......... F25B 43/006; F25B 40/02; F25B 7/00; F25B 2341/0011; F25B 2400/13; F25B 2400/23; F25B 2600/13; F25B 9/08
See application file for complete search history.

(56) References Cited

U.S. PATENT DOCUMENTS

| 7,207,190 | B2 | 4/2007 | Sugiura et al. |
| 8,955,343 | B2 | 2/2015 | Verma et al. |
| 9,261,298 | B2 | 2/2016 | Wang et al. |
| 10,465,983 | B2 | 11/2019 | Ladd |
| 10,514,201 | B2 | 12/2019 | Ladd |

(Continued)

FOREIGN PATENT DOCUMENTS

| CN | 103003640 A | 3/2013 |
| CN | 103003643 A | 3/2013 |

(Continued)

OTHER PUBLICATIONS

Gunai Ren; Notice of Review Opinion for TW Application Serial No. 112108423; Nov. 17, 2023; 16 pages; Intellectual Property Bureau of the Ministry of Economic Affairs; Taiwan.

(Continued)

Primary Examiner — Miguel A Diaz
(74) Attorney, Agent, or Firm — William P. Jensen; Crain Caton & James, P.C.

(57) ABSTRACT

Systems and methods for regenerative ejector-based cooling cycles that utilize an ejector as the motivating force in a cooling loop to regeneratively sub-cool a refrigerant in a single-stage cooling cycle.

17 Claims, 5 Drawing Sheets

(56) References Cited

U.S. PATENT DOCUMENTS

| | | |
|---|---|---|
| 10,514,202 B2 | 12/2019 | Ladd |
| 10,533,793 B2 | 1/2020 | Ladd |
| 11,215,386 B2 | 1/2022 | Hellmann |
| 11,561,027 B2 | 1/2023 | Ladd et al. |
| 11,821,668 B2 | 11/2023 | Ladd et al. |
| 2001/0025499 A1* | 10/2001 | Takeuchi ............... F25B 41/00 62/175 |
| 2012/0167601 A1* | 7/2012 | Cogswell ............... F25B 41/22 62/115 |
| 2013/0055751 A1 | 3/2013 | Inaba |
| 2020/0292219 A1 | 9/2020 | Li et al. |
| 2022/0026114 A1* | 1/2022 | Aidoun ................... F25B 1/10 |
| 2022/0390149 A1 | 12/2022 | Vaisman et al. |
| 2024/0118001 A1 | 4/2024 | Ma et al. |

FOREIGN PATENT DOCUMENTS

| | | | |
|---|---|---|---|
| CN | 103282730 A | | 9/2013 |
| CN | 103776189 A | | 5/2014 |
| CN | 109682103 A | | 4/2019 |
| CN | 110296543 A | | 10/2019 |
| CN | 110319612 A | | 10/2019 |
| CN | 110345584 A | | 10/2019 |
| CN | 113513854 A | * | 10/2021 |
| CN | 113776214 A | | 12/2021 |
| DE | 102019111309 | | 11/2020 |
| EP | 4006443 A1 | | 6/2022 |
| JP | 2007255771 | | 10/2007 |
| JP | 7526926 B2 | | 8/2024 |
| WO | 2017081157 A1 | | 5/2017 |
| WO | 2021113423 | | 6/2021 |

OTHER PUBLICATIONS

Shecco, "World Guide to Low-Charge Ammonia", Ammonia21, 106 pages, 2019.

Liu et al., "Recovery fo Throttling Losses by a Two-Phase Ejector in a Vapor Compression Cycle", Air-Conditioning and Refrigeration Technology Institute, Inc., 139 pages, May 2008.

Chen et al., "Theoretical study on a modified subcooling vapor-compression refrigeration cycle using hydrocarbon mixture R290/R600a", International Refrigeration and Air Conditioning Conference, 10 pages, Jul. 9-12, 2018.

Barta et al., "Experimental and Numerical Optimization of a Variable-Geometry Ejector in a Transcritical CO2 Refrigeration Cycle", 18th International Refrigeration and Air Conditioning Conference, 13 pages, May 24-28, 2021.

Li et al., "Transcritical CO2 Refrigeration Cycle with Ejector-Expansion Device", International Refrigeration and Air Conditioning Conference, 11 pages, Jul. 12-15, 2004.

Chen et al., "A review on versatile ejector applications in refrigeration systems", Renewable and Sustainable Energy Reviews 49, 24 pages, 2015.

* cited by examiner

FIG. 1

"Prior Art"

SYSTEMS AND METHODS FOR REGENERATIVE EJECTOR-BASED COOLING CYCLES

CROSS-REFERENCE TO RELATED APPLICATIONS

This application is a continuation of U.S. application Ser. No. 18/340,642, which is a continuation of U.S. Pat. No. 11,725,858, which is a U.S. National Stage Application of PCT Application Serial No. PCT/US22/19352 filed on Mar. 8, 2022, each of which are incorporated herein by reference. This application, PCT Application No. PCT/US21/49010, and U.S. Pat. Nos. 11,561,027, 10,514,201, 10,533,793, 10,465,983 and 10,514,202, which are each also incorporated herein by reference, are commonly assigned to Bechtel Energy Technologies & Solutions, Inc.

FIELD OF THE DISCLOSURE

The present disclosure generally relates to systems and methods for regenerative ejector-based cooling cycles. More particularly, the systems and methods utilize an ejector as the motivating force in a cooling loop to regeneratively sub-cool a refrigerant in a single-stage cooling cycle.

BACKGROUND

The use of heat exchangers to modify the thermodynamic performance of cooling cycles is well known. An exemplary heat exchanger in a conventional cooling cycle is known as a suction line heat exchanger (SLHX). The purpose of a SLHX is to preheat a refrigerant before it enters the compressor.

Figure 1:
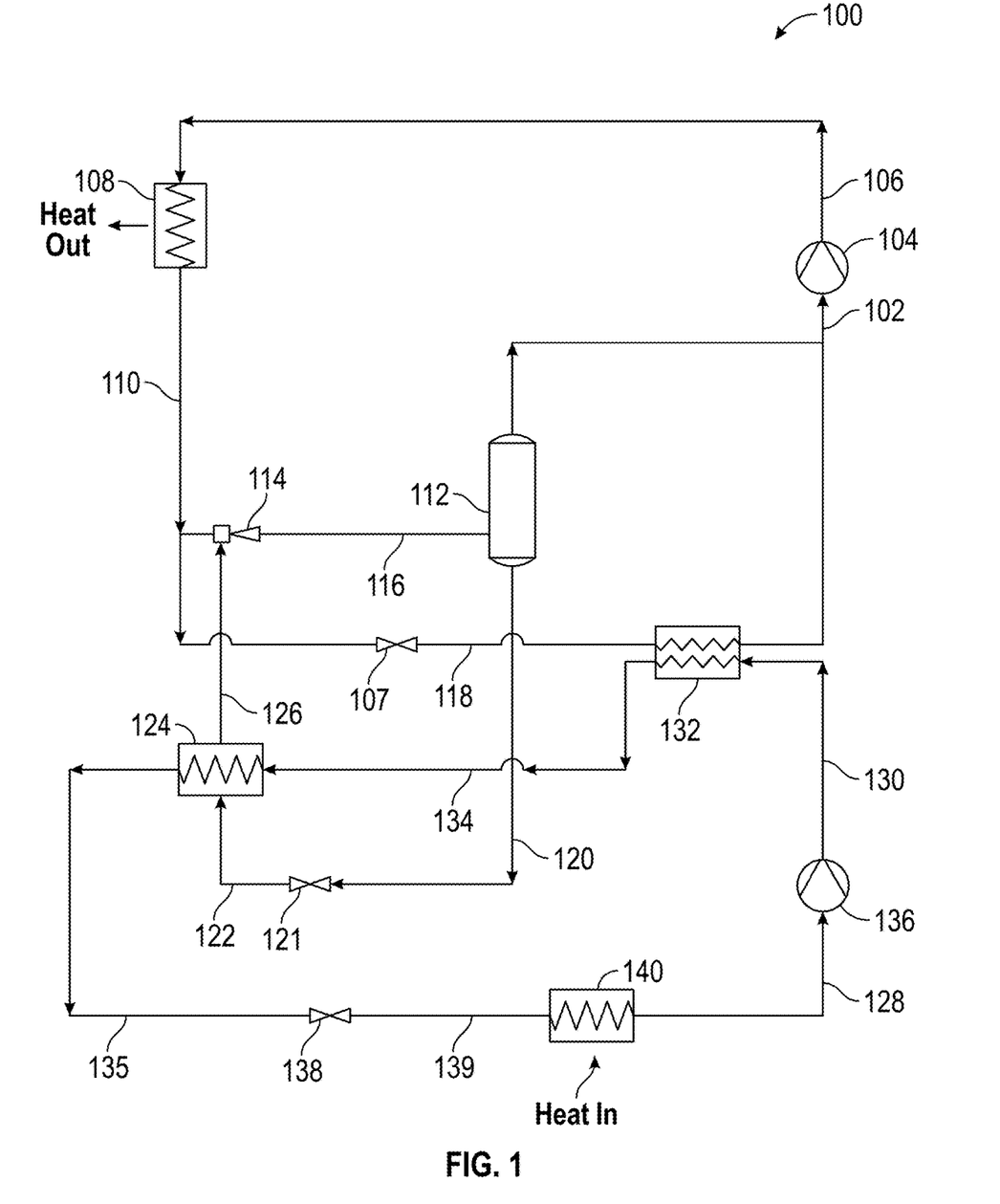
FIG. 1 is a schematic diagram illustrating a system for use in a conventional two-stage ejector-based cooling cycle.

Other concepts have been proposed for leveraging heat exchangers to sub-cool a refrigerant in a cooling cycle using an ejector. In FIG. 1, for example, heat exchangers are used in a system 100 for use in a conventional two-stage cooling cycle with an ejector to sub-cool a refrigerant and reduce the total power consumption of the system, which is also referred to as cascade refrigeration.

A vapor first refrigerant enters a first compressor 104 from a vaporized first refrigerant line 102 and is compressed to an evaporating pressure dictated by ambient conditions. The compressed vapor first refrigerant passes through a compressed first refrigerant line 106 to a heat exchanger referred to as an evaporative condenser 108. The condensed liquid first refrigerant passes through a condensed refrigerant line 110 to a first expansion valve 107 and/or an ejector 114 based on a control valve (not shown).

The condensed liquid first refrigerant expands as it passes through the expansion valve 107. The expanded two-phase first refrigerant passes through a first expanded first refrigerant line 118 to a heat exchanger referred to as a cascade exchanger 132 where it is vaporized by heat and used to cool a second refrigerant from a compressed second refrigerant line 130 forming part of the second stage of the cooling cycle. The vaporized first refrigerant passes through the vaporized first refrigerant line 102 to the compressor 104.

The condensed liquid first refrigerant enters the ejector 114 as a motive fluid where it is mixed with vaporized first refrigerant from another vaporized first refrigerant line 126 and is ejected from the ejector 114 as a two-phase first refrigerant. The two-phase first refrigerant passes through a two-phase first refrigerant line 116 to a flash economizer 112 where it is flashed into a vapor first refrigerant and a liquid first refrigerant. The vapor first refrigerant from the flash economizer 112 enters the compressor 104 through the vaporized first refrigerant line 102. The liquid first refrigerant from the flash economizer 112 passes through a liquid first refrigerant line 120 to a second expansion valve 121. The liquid first refrigerant expands as it passes through the second expansion valve 121. The expanded two-phase first refrigerant passes through a second expanded first refrigerant line 122 to a heat exchanger referred to as a sub-cooler 124 where it is vaporized by heat and used to cool the second refrigerant from a cooled second refrigerant line 134 forming part of the second stage of the cooling cycle. The vaporized first refrigerant from the sub-cooler 124 passes through the another vaporized first refrigerant line 126 to the ejector 114.

A vaporized second refrigerant passes through a vaporized second refrigerant line 128 to a second compressor 136. The compressed vapor second refrigerant passes through the compressed second refrigerant line 130 to the cascade exchanger 132 where it is cooled. The cooled liquid second refrigerant passes through the cooled second refrigerant line 134 to the sub-cooler 124 where it is further cooled. The sub-cooled liquid second refrigerant from the sub-cooler 124 passes through a sub-cooled second refrigerant line 135 to a third expansion valve 138. The expanded two-phase second refrigerant passes through an expanded second refrigerant line 139 to a heat exchanger referred to as an evaporator 140 where it is vaporized by heat into the vaporized second refrigerant. The two-stage cooling cycle system 100 thus, requires two cascading cooling loops and a refrigerant for each respective stage.

BRIEF DESCRIPTION OF THE DRAWINGS

The detailed description is described below with reference to the accompanying drawings, in which like elements are referenced with like reference numbers, in which.

DETAILED DESCRIPTION OF THE ILLUSTRATIVE EMBODIMENTS

The subject matter of the present disclosure is described with specificity, however, the description itself is not intended to limit the scope of the disclosure. The subject matter described herein thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. To the extent that temperatures and pressures are referenced in the following description, those conditions are merely illustrative and are not meant to limit the disclosure.

The systems and methods disclosed herein thus, improve conventional two-stage cooling cycles by utilizing an ejector as the motivating force in a cooling loop to regeneratively sub-cool a refrigerant in a single-stage cooling cycle. The systems and methods disclosed herein accomplish the same or greater energy efficiency as a conventional two-stage cooling cycle, but with less equipment because a second stage is not needed to accomplish the subcooling effect. The single-stage cooling cycle disclosed herein also does not require a high entrainment ratio ejector, which reduces the compression ratio and increases the energy efficiency of the cooling cycle.

In one embodiment, a system for use with a refrigerant in a single-stage cooling cycle is disclosed, which comprises: i) an ejector for mixing a condensed liquid form of the refrigerant and a first vaporized form of the refrigerant to form a two-phase form of the refrigerant; ii) a flash economizer in fluid communication with the ejector for separating the two-phase form of the refrigerant from the ejector into a second vaporized form of the refrigerant and a liquid form of the refrigerant; iii) a sub-cooler connected to the ejector by a vaporized refrigerant line for cooling a portion of the liquid form of the refrigerant from a liquid refrigerant line fluidly connected to the flash economizer and vaporizing the another two-phase form of the refrigerant; iv) an evaporator in fluid communication with the sub-cooler for heating a separate sub-cooled liquid form of the refrigerant by transferring heat from an external source to the separate sub-cooled liquid form of the refrigerant and producing a third vaporized form of the refrigerant wherein the flash economizer is connected to the evaporator for receiving the third vaporized form of the refrigerant.

In another embodiment, a regenerative cooling method is disclosed, which comprises: i) mixing a condensed liquid form of a refrigerant and a first vaporized form of the refrigerant to form a two-phase form of the refrigerant; ii) separating the two-phase form of the refrigerant into a second vaporized form of the refrigerant and a liquid form of the refrigerant; iii) cooling a first portion of the liquid form of the refrigerant by transferring heat from the first portion of the liquid form of the refrigerant to another two-phase form of the refrigerant and producing the first vaporized form of the refrigerant and a separate sub-cooled liquid form of the refrigerant; iv) heating the separate sub-cooled liquid form of the refrigerant by transferring heat from an external source to the sub-cooled liquid form of the refrigerant and producing the third vaporized form of the refrigerant.

Figure 2:
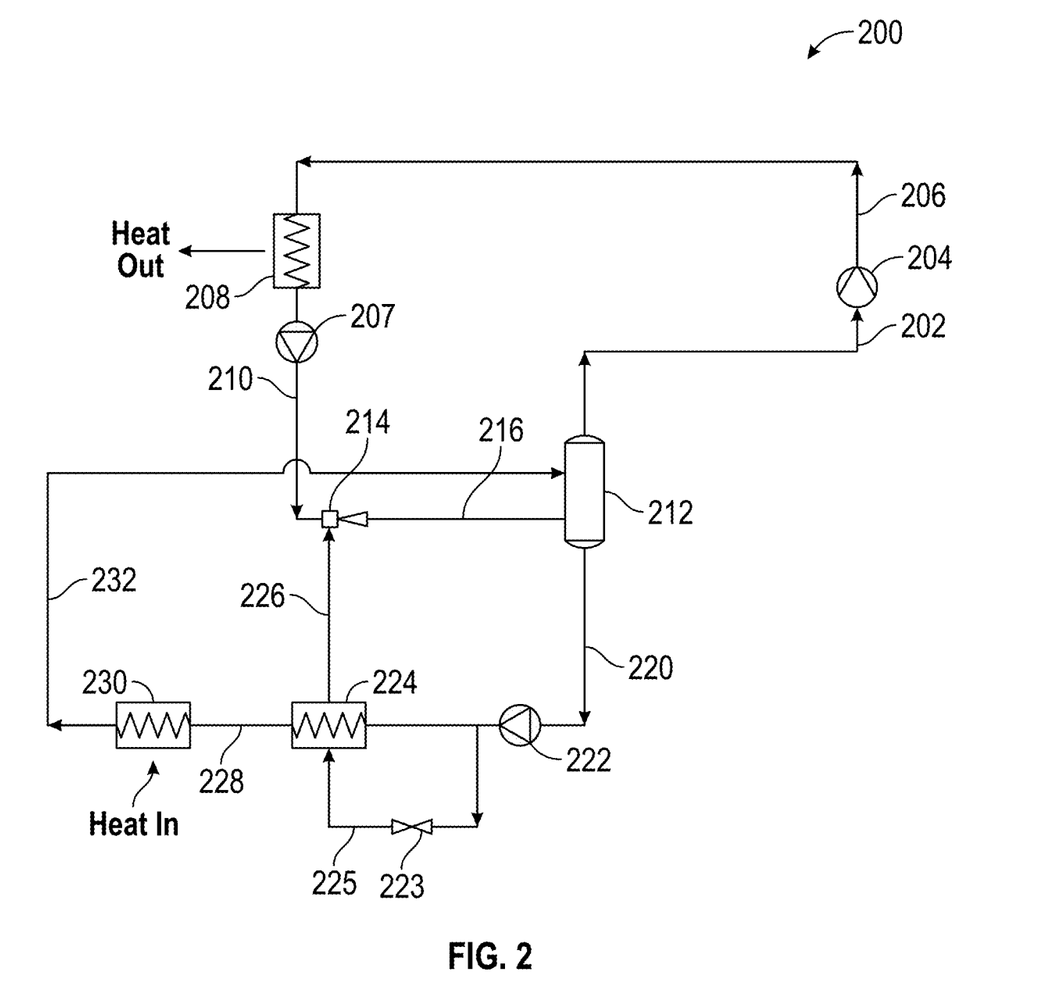
FIG. 2 is a schematic diagram illustrating one embodiment of a system for use in a single-stage regenerative ejector-based cooling cycle.

Referring now to FIG. 2, one embodiment of a system 200 for use in a single-stage regenerative ejector-based cooling cycle with a single refrigerant is illustrated. An exemplary refrigerant is an R-134A refrigerant with a cooling duty of 5.4 MW for cooling a circulating cooling water system from 30° C. (86° F.) to 22° C. (72° F.), although others may be used.

A vapor refrigerant enters a compressor 204 from a first vaporized refrigerant line 202 and is compressed to a pressure of 114 psig and a temperature of 107° F. The compressed vapor refrigerant passes through a compressed refrigerant line 206 to a heat exchanger referred to as an evaporative condenser 208. The condensed liquid refrigerant passes through a condensed refrigerant line 210 with the aid of a pump 207 at a temperature of 95° F. to an ejector 214. Due to the flexibility provided by the pump 207 and the ejector 214, the system 200 can achieve a higher coefficient of performance and lower energy consumption than conventional systems. The pump 207 thus, enables a higher discharge pressure at the ejector 214 and a higher intermediate pressure at the flash economizer 212. Optionally, the pump 207 may be removed based on capital costs, maintenance concerns and/or system restrictions.

The condensed liquid refrigerant enters the ejector 214 as motive fluid where it is mixed with vaporized refrigerant from a second vaporized refrigerant line 226 and is ejected from the ejector 214 as a two-phase refrigerant. The motive fluid will always be a liquid because it is located directly downstream from the evaporative condenser 208. The two-phase refrigerant passes through a two-phase refrigerant line 216 to a flash economizer 212 where it is flashed into a vapor refrigerant and a liquid refrigerant. Optionally, an adjustment valve may be used for operational flexibility.

The vapor refrigerant from the flash economizer 212 enters the compressor 204 through the first vaporized refrigerant line 202. The liquid refrigerant from the flash economizer 212 passes through a liquid refrigerant line 220 to a pump 222. Optionally, the flash economizer 212 and the pump 202 may be unnecessary for smaller cooling cycles and thus, removed. The liquid refrigerant is pumped to an expansion valve 223 and/or a sub-cooler 224 based on a control valve (not shown).

The liquid refrigerant expands as it passes through the expansion valve 223. The expanded two-phase refrigerant passes through an expanded refrigerant line 225 to the sub-cooler 224 where it is vaporized by heat and used to cool the liquid refrigerant from the pump 222. The vaporized refrigerant from the sub-cooler 224 passes through the second vaporized refrigerant line 226 to the ejector 214.

The sub-cooled liquid refrigerant from the sub-cooler 224 passes through a sub-cooled refrigerant line 228 to an evaporator 230 where it is vaporized by heat into a vaporized refrigerant that passes through a third vaporized refrigerant line 232 to the flash economizer 212 where it is eventually recycled back to the compressor 204 through the first vaporized refrigerant line 202. The system 200 requires a single refrigerant and thus, fewer components than the conventional system 100 for use in a two-stage ejector-based cooling cycle, which is less economical and efficient at cooling.

Figure 3:
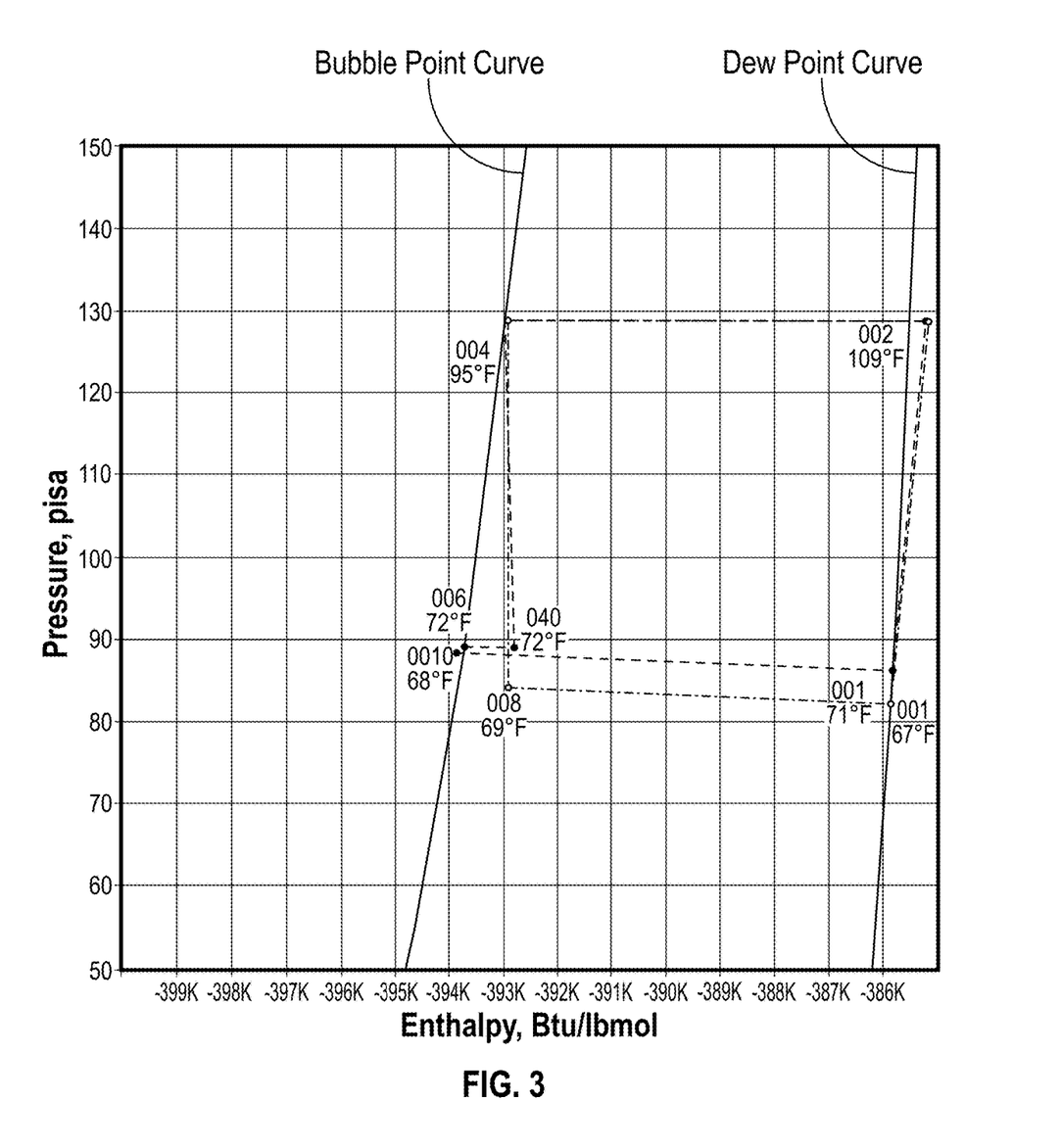
FIG. 3 is a Pressure-Enthalpy diagram comparing anticipated pressure/enthalpy values at state points for the system illustrated in FIG. 2 and a conventional four (4) component cooling cycle.

The Pressure-Enthalpy diagram in FIG. 3 compares anticipated pressure/enthalpy values at state points for the system 200 illustrated in FIG. 2 and a conventional four (4) component cooling cycle. The dashed lines connect the state points for the system 200 and the dashed/dotted lines connect the state points for the conventional 4 component cooling cycle. The Bubble Point Curve represents the line beyond which the refrigerant is a liquid. The Dew Point Curve represents the line beyond which the refrigerant is a vapor.

Figure 4:
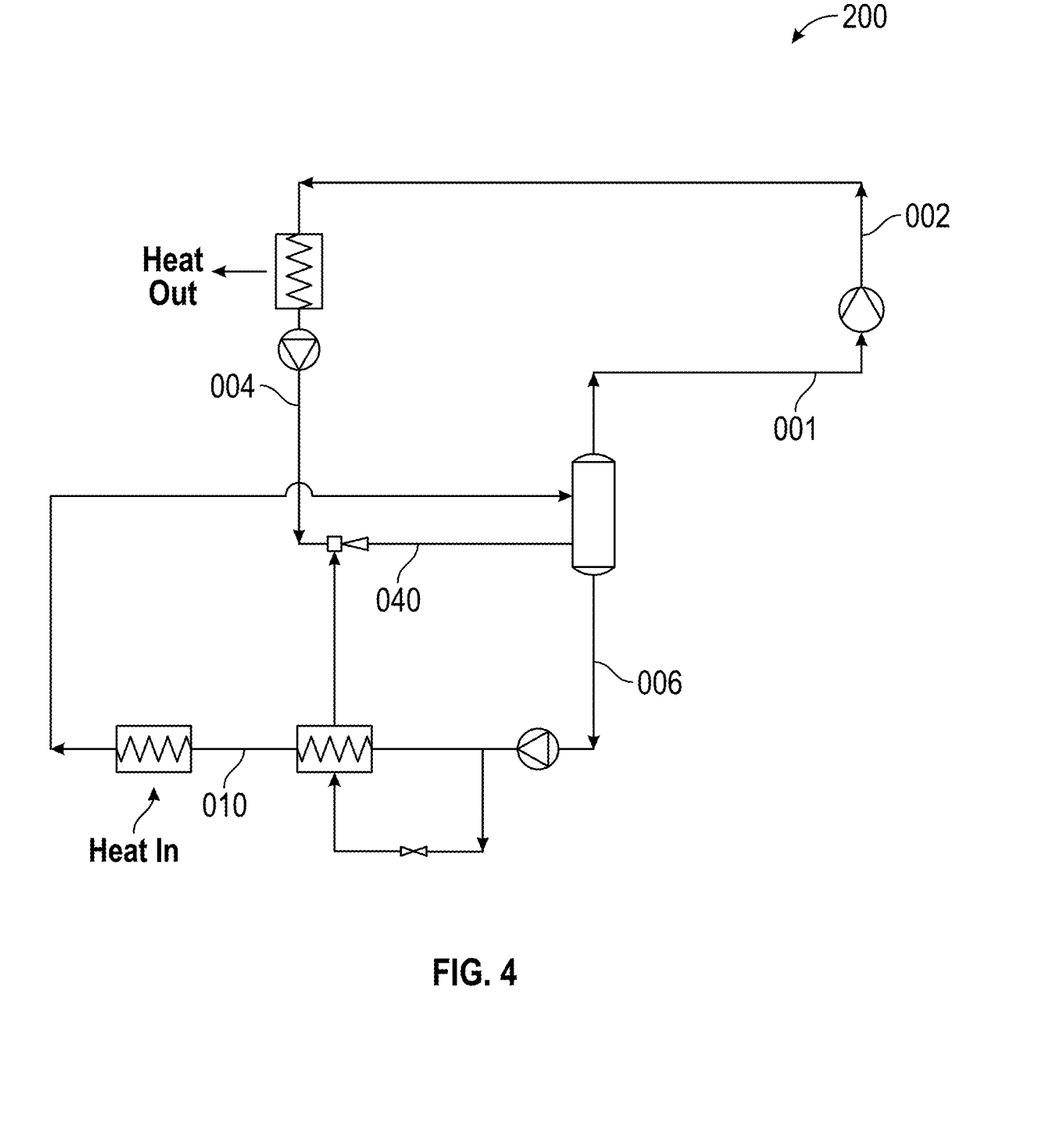
FIG. 4 is the schematic diagram of the system in FIG. 2 with the reference numbers replaced by the corresponding state points in FIG. 3.

In FIG. 4, the system 200 in FIG. 2 is illustrated with the reference numbers replaced by the corresponding state points in FIG. 3. Significantly, the transition of the refrigerant from state point 040 to state point 010 by means of the sub-cooler 224 facilitates a higher inlet pressure at the compressor 204 at state point 001 and a subsequent reduction in the differential pressure between state points 001 and 002. State point 0010 for the system 200 compared to state point 008 in the conventional 4 component cycle illustrated in FIG. 3 demonstrate that the single refrigerant in the system 200 achieves the same cooling temperature as the conventional 4 component cycle while operating at a higher pressure than the conventional 4 component cycle, which reduces compression energy.

Table 1 below compares the anticipated performance of the conventional 4 component cooling cycle and the single-stage regenerative ejector-based cooling cycle illustrated in FIG. 2 using a simulation model (Aspen HYSYS version 12.1) with projected ejector performance. As demonstrated by the anticipated results, the single-stage regenerative ejector-based cooling cycle illustrated in FIG. 2 would yield a higher coefficient of performance with less compression power.

TABLE 1

|  | Conventional Cooling Cycle | FIG. 2 Cooling Cycle |
| --- | --- | --- |
| Cooling Duty, MW | 5.4 | 5.4 |
| Coefficient of Performance | 10.05 | 11.43 |
| Compression Power, kW | 534 | 470 |

Figure 5:
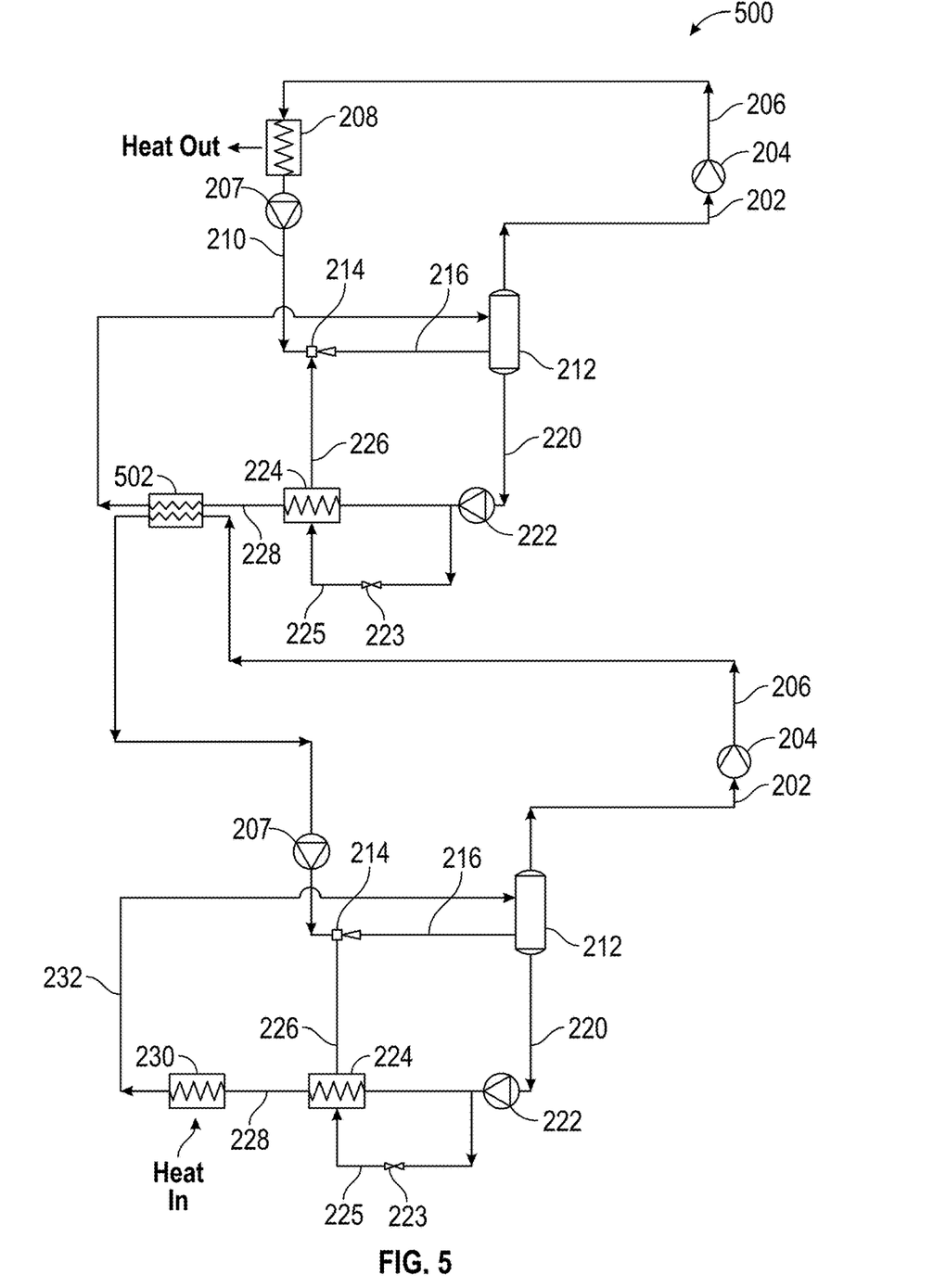
FIG. 5 is a schematic diagram illustrating one embodiment of a system for use in two combined single-stage regenerative ejector-based cooling cycles.

The system 200 in FIG. 2 can be combined with another single-stage regenerative ejector-based cooling cycle like the one illustrated in FIG. 2 by replacing the evaporator 230 in one cooling cycle and the evaporative condenser 208 in the other cooling cycle with a single cascade exchanger 502 as illustrated in FIG. 5, which enables cooling at lower temperatures such as, for example, in ultra-low temperature applications with independent refrigerants.

While the present disclosure has been described in connection with presently preferred embodiments, it will be understood by those skilled in the art that it is not intended to limit the disclosure of those embodiments. Preexisting ejector-based cooling cycles may be retrofitted or modified according to the disclosure herein, which may also be implemented in any other refrigeration process employed in an enclosed structure for heating or cooling to achieve similar results. It is therefore, contemplated that various alternative embodiments and modifications may be made to the disclosed embodiments without departing from the spirit and scope of the disclosure defined by the appended claims and equivalents thereof.

The invention claimed is:

1. A system for use with a refrigerant in a regenerative cooling cycle, which comprises:
   an ejector for mixing a condensed liquid form of the refrigerant and a first vaporized form of the refrigerant to form a two-phase form of the refrigerant;
   a flash economizer in fluid communication with the ejector for separating the two-phase form of the refrigerant from the ejector into a second vaporized form of the refrigerant and a liquid form of the refrigerant;
   a sub-cooler connected to the ejector by a vaporized refrigerant line for cooling a portion of the liquid form of the refrigerant from a liquid refrigerant line fluidly connected to the flash economizer and vaporizing another two-phase form of the refrigerant; and
   an evaporator in fluid communication with the sub-cooler for heating a separate sub-cooled liquid form of the refrigerant by transferring heat from an external source to the separate sub-cooled liquid form of the refrigerant and producing a third vaporized form of the refrigerant, wherein the flash economizer is connected to the evaporator for receiving the third vaporized form of the refrigerant.

2. The system of claim 1, further comprising a pump positioned between the flash economizer and the sub-cooler for distributing the liquid form of the refrigerant.

3. The system of claim 1, further comprising a compressor connected to the flash economizer for compressing the second vaporized form of the refrigerant.

4. The system of claim 1, further comprising a pump positioned upstream from the ejector for increasing at least one of a discharge pressure at the ejector and an intermediate pressure at the flash economizer.

5. The system of claim 1, wherein a temperature and a pressure for the second vaporized form of the refrigerant are substantially 72° F. and substantially 89 psia, respectively.

6. The system of claim 1, wherein a temperature and a pressure for the liquid form of the refrigerant are substantially 95° F. and substantially 129 psia, respectively.

7. The system of claim 1, wherein a temperature and a pressure for the sub-cooled liquid form of the refrigerant are substantially 68° F. and substantially 88 psia, respectively.

8. The system of claim 1, wherein a temperature and a pressure for the two-phase form of the refrigerant are substantially 72° F. and substantially 89 psia, respectively.

9. A regenerative cooling method, which comprises:
   mixing a condensed liquid form of a refrigerant and a first vaporized form of the refrigerant to form a two-phase form of the refrigerant;
   separating the two-phase form of the refrigerant and a third vaporized form of the refrigerant into a second vaporized form of the refrigerant and a liquid form of the refrigerant;
   cooling a first portion of the liquid form of the refrigerant by transferring heat from the first portion of the liquid form of the refrigerant to another two-phase form of the refrigerant and producing the first vaporized form of the refrigerant and a separate sub-cooled liquid form of the refrigerant; and
   heating the separate sub-cooled liquid form of the refrigerant by transferring heat from an external source to the sub-cooled liquid form of the refrigerant and producing the third vaporized form of the refrigerant.

10. The method of claim 9, further comprising compressing the second vaporized form of the refrigerant.

11. The method of claim 9, further comprising increasing at least one of a discharge pressure at an ejector and an intermediate pressure at a flash economizer with a pump.

12. The method of claim 9, wherein a temperature and a pressure for the second vaporized form of the refrigerant are substantially 72° F. and substantially 89 psia, respectively.

13. The method of claim 9, wherein a temperature and a pressure for the liquid form of the refrigerant are substantially 95° F. and substantially 129 psia, respectively.

14. The method of claim 9, wherein a temperature and a pressure for the separate sub-cooled liquid form of the refrigerant are substantially 68° F. and substantially 88 psia, respectively.

15. The method of claim 9, wherein a temperature and a pressure for the two-phase form of the refrigerant are substantially 72° F. and substantially 89 psia, respectively.

16. The method of claim 9, wherein a temperature and a pressure for the first vaporized form of the refrigerant are substantially 60° F. and substantially 72 psia, respectively.

17. The method of claim 9, wherein the refrigerant is a refrigerant with a cooling duty of 5.4 MW for cooling a circulating cooling water system from substantially 86° F. to substantially 72° F.

* * * * *